United States Patent [19]
Reinhardt et al.

[11] 3,864,453
[45] Feb. 4, 1975

[54] PROCESS FOR THE PRODUCTION OF ALKALI FERROCYANIDE

[75] Inventors: Helmut Reinhardt, Rodenkirchen; Karl Trebinger; Gottfried Kallrath, both of Wesseling, all of Germany

[73] Assignee: Deutsche Gold-und Silber-Scheideanstalt vormals Roessler, Frankfurt (Main), Germany

[22] Filed: Mar. 20, 1973

[21] Appl. No.: 343,171

[30] Foreign Application Priority Data
Mar. 27, 1972 Germany.......................... 2214827

[52] U.S. Cl. .............................................. 423/367
[51] Int. Cl. ............................................... C01c 3/12
[58] Field of Search .................................. 423/367

[56] References Cited
UNITED STATES PATENTS

| | | | |
|---|---|---|---|
| 624,383 | 5/1899 | Schröder | 423/367 |
| 1,252,742 | 1/1918 | Tillinghast | 423/367 |
| 3,141,733 | 7/1964 | Broisman | 423/367 |

Primary Examiner—Oscar R. Vertiz
Assistant Examiner—Eugene T. Wheelock
Attorney, Agent, or Firm—Cushman, Darby & Cushman

[57] ABSTRACT

Alkali ferrocyanides are prepared by converting calcium hexacyanoferrate (II) with an iron (II) salt to an iron (II) hexacyanoferrate (II), washing the complex with water until free of calcium ions and then reacting further with sodium, potassium or ammonium cyanide.

11 Claims, No Drawings

PROCESS FOR THE PRODUCTION OF ALKALI FERROCYANIDE

It is known to produce potassium hexacyanoferrate (II) from calcium hexacyanoferrate (II) by transformation with potassium chloride to the double salt (CaK$_2$.[Fe(CN)$_6$]) and further reaction of the double salt with potassium carbonate to form potassium ferrocyanide and calcium carbonate. The double salt is difficultly soluble in water and therefore the ferrocyanide can be freed from the soluble byproducts (calciumchloride) by filtration.

The production of sodium hexacyanoferrate (II) resembles that described above for the potassium salt.

In both processes there results a considerable amount of the calcium salt. Thus there is formed per mole of potassium ferrocyanide 2 moles of calcium chloride and 1 mole of calcium carbonate. In the production of sodium ferrocyanide the proportions are similar.

In contrast it has now been found that alkali ferrocyanides, i.e. sodium ferrocyanide, potassium ferrocyanide or ammonium ferrocyanide can be produced by choice if solutions of calcium hexacyanoferrate (II) are first reacted with iron (II) salt solutions to an iron (II) salt of ferrocyanic acid, whereupon this insoluble salt, in a given case after addition of a flocculating agent, is washed free of calcium ions with water and then reacted further with solutions of sodium, potassium or ammonium cyanide to form the corresponding alkalihexacyanoferrate (II). The reaction occurs in aqueous medium.

The reaction solutions can be added either in pure form or in technical form or in the form of waste products. Thus there can be used as the aqueous solution of calcium hexacyanoferrate (II) the product recovered by known processes which is calcium chloride free, suitably made according to German Pat. No. 1,957,527, for example. The entire disclosure of German Pat. No. 1,957,527 is hereby incorporated by reference. The calcium ferrocyanide solution can be added in unfiltered form which considerably simplifies the course of the production. Likewise there can be used as iron salt solutions waste acids of iron pickling as well as technical alkali cyanide solutions from electroplating operation, the removal of which is expensive. This is made harmless in this manner and besides is still profitably added.

As iron salts there can be used besides iron (II) chloride salts of other acids which do not form insoluble calcium salts, as for example, ferrous nitrate, ferrous halides, e.g. ferrous bromide, ferrous iodide, etc.

The reaction of calcium hexacyanoferrate (II) and iron (II) salts occurs at temperatures of 10° to 100°C., preferably at 60° to 90°C.

The temperature of the wash water can be between 10° and 95°C., conveniently at room temperature.

The reaction of the iron salt of the ferrocyanic acid with the alkali cyanides is carried out at temperatures of 20° to 100°C., preferably 60° to 95°C., namely in the equivalent amounts. An excess of the iron salt, e.g. an excess up to 0.5 mole percent is not injurious.

Both the formation of the iron salt of the ferrocyanic acid as well as the further reaction with the alkali cyanide can be carried out in known manner in a mixing vessel in which care is taken for an adequate mixing by inclusion of propellers, turbines or disc stirrers as well as in revolving mixers. The filtering off of the named iron salts and the washing of these salts is further described below.

The solutions of alkali hexacyanoferrate (II) resulting from the reaction of ferrocyanic acid with the iron salt are worked up in known manner to the solid salt by direct crystallization or by spray drying. Further purification methods can be omitted.

In the method of producing the invention it is essential that the amount of resulting calcium compounds, calculated on a mole of alkali hexacyanoferrate (II), is reduced to one third of that of previous methods of production. These calcium compounds besides are present as solutions and not as solids. Therefore they do not laden the waste water system, since they act as flocculant assistants, for example in the flocculation of iron (II) hexacyanoferrate (II) itself.

As flocculating agents for iron (II) ferrocyanide there are especially suited non-ionic products, which are largely independent of pH value. Examples of flocculating agents include polyacrylamide, polyalcohols, polyimids, and polyoxyethylene.

The pH value is not critical for the flocculation, but it is only important that it is not higher than 8. In the entire pH range of 1 to 8 there were obtained large, easily settling out flocks.

The flocculated complex is freed from the mother liquor in known manner by decantation or by filtration on filter presses and then is washed until it is free of calcium ion. In a given case the suspension present after the washing can be concentrated in centrifuges.

Preferably the calcium ions are washed out of the iron cyanide complex according to the process of purification of poorly filterable precipitates, as set forth in our application Ser. No. 343,170 entitled "Process and Apparatus for the Releasing of Materials from Voluminous Precipitates or Suspensions," filed on even date and corresponding to German application P 22 14 826.1. The entire disclosure of our copending application filed on even date is hereby incorporated by reference. By a countercurrent process the iron (II) ferrocyanide is converted into an aqueous suspension which is free of calcium ion and then can be easily concentrated in centrifuges. The process is feasible for continuous operation.

The industrial advantage of the process of the invention, besides the reduction of the accruing calcium compound to one-third of the former value and the relief of the waste system tied thereto, is in the possibility of adding impure starting materials. Thereby there are profitably employed materials which were waste until now, whose removal was difficult, such as waste acids or cyanide solutions from electroplating operations, namely without any accumulation of poisonous waste water.

By the process of the invention it is also for the first time possible to industrially substantially simplify the production of alkali ferrocyanides in processes independent of each other and simultaneously to drastically reduce the amount of byproducts.

Unless otherwise indicated all parts and percentages are by weight. The invention will be further explained in the following examples:

EXAMPLE 1

1 liter of an aquous solution of 69 grams of calcium ferrocyanide was stirred into 1 liter of a waste acid (63 grams FeCl$_2$/liter; 2 grams HCl/liter) at room temperature. The precipitation is ended after 5 minutes. There were introduced into the suspension with slow stirring 100 ml of a 0.05 percent aqueous solution of a flocculating agent (high molecular weight polyacrylamide). Thereupon there were formed thick flocks which quickly settled. The soluble constituents were washed 5 times by decantation.

The thickened suspension was introduced into 400 ml of a 90°C. hot sodium cyanide solution (312 grams/liter) with stirring. Thereupon there were formed small amounts (3 grams) of a floccular precipitate of iron-(III) hydroxide which was filtered off. There were obtained 930 ml of a solution having a concentration of 233 grams of $Na_4[Fe(CN)_6]$/liter which was worked up in known manner by evaporation and crystallization.

EXAMPLE 2

55 m³ of an aqueous solution of 67 grams/liter of $Ca_2[Fe(CN)_6]$ and 6.2 grams/liter of $CaCl_2$, which still contained 50 kg/m³ of undissolved constituents were stirred into 40 m³ of a solution of 71 grams/liter of $FeCl_2$ and 2 grams/liter of HCl. This required about one-half hour. The acid suspension was treated with 3 m³ of a 0.05 percent solution of the same flocculating agent as in example 1. In the lower part of the container there was provided a drain over which the flocculated suspension could enter into the lower situated filter press. As the press was filled to about 70 percent the pressure of the entering suspension was increased with the help of a pump. The press was filled after about 1 ¼ hour. Then washing with cold water was carried out for 10 hours until the calcium content of the draining water corresponded to that of the entering water. Then the press was emptied and the filter cake introduced into 23 m³ of aqueous potassium cyanide solution (306 grams/liter, 95°C.) by means of a conveyor belt. Except for a small amount of iron (III) hydroxide the precipitate dissolved quantitatively with formation of potassium hexacyanoferrate (II). The iron (III) hydroxide was separated with a centrifuge.

EXAMPLE 3

Iron (II) ferrocyanide was precipitated and flocculated in the manner described in example 1. Then the product was washed countercurrently in a continuously operating washing apparatus, such as described in our above mentioned companion application filed on even date. Briefly this apparatus was of glass and consisted of a tubular column having a lower portion 24 cm long and 9 cm in diameter and an upper portion 16 cm long and 14 cm in diameter. The two portions were connected by a conical section. Near the bottom of the lower portion there were provided a glass frit through which wash water was introduced upwardly. A drain was provided through the frit to allow the washed solution to be removed downwardly. A concentric dip tube was provided through the upper portion for introduction of the iron (II) ferrocyanate suspension. The dip tube terminated in the conical section. A deflection plate was provided at the lower end of the conical section to disperse material coming from the dip tube. The dispersed material flowed downwardly countercurrently to the wash water.

The draining suspension obtained contained 32 grams/liter of $[Fe_2Fe(CN)_6]$ and had to be thickened by decantation before the addition of the cyanide solution. The working up of the sodium ferrocyanide again took place in accordance with the method described in example 1.

The calcium hexacyanoferrate (II) solution employed, for example, can be an unfiltered aqueous solution which results from the reaction of hydrogen cyanide, aqueous iron (II) salt, e.g. aqueous iron (II) chloride and a calcium compound, e.g. calcium hydroxide or calcium carbonate. Thus there can be used an unfiltered aqueous solution of calcium hexacyanoferrate (II) prepared as follows:

120 grams (1.2 moles) of $CaCO_3$ were suspended in 300 cc. of water and there was added a solution of 158.5 grams of $FeCl_2$ (corresponding to 70 grams Fe, 1.25 moles) in 400 cc. of water.

The mixture was heated to 60°C., with stirring, while there was fed in over 16 minutes, 64.8 grams (2.4 moles) of liquid hydrocyanic acid with a density of 0.7 diluted with water in the ratio of 1 : 1.

During the first reaction step the temperature was held in the range of 60° to 70°C. The pH was adjusted to 4.

In the immediately following second reaction step there were added to the reaction suspension over a period of 42 minutes, 190 grams of $Ca(OH)_2$ (2.50 moles) as a suspension in 400 cc. of water and also 129.6 grams of liquid hydrocyanic acid (4.8 moles) with a density of 0.7 diluted with water in the ratio of 1 : 1. The temperature in the second reaction step likewise amounted to 60° to 70°C. The reaction solution having a pH of 10 was stirred further for a short period of time and then discharged.

There were obtained 1,950 cc. of a solution having a density of 1.19 gram/cc. This solution contained 15 grams per liter of dry solids, 4.0 grams per liter of $Ca(OH)_2$ and 312 grams per liter $Ca_2[Fe(CN)_6] \cdot 12 H_2O$.

What is claimed is:

1. A process for the production of an alkali or ammonium ferrocyanide comprising (1) reacting at 10° to 100°C. an aqueous solution of calcium hexacyanoferrate (II) with an aqueous solution of an iron (II) salt, washing the insoluble iron (II) hexacyanoferrate II complex formed with water until it is free of calcium ions and then (2) adding an aqueous solution of sodium, potassium or ammonium cyanide at 20° to 200°C. to the washed product to form an aqueous solution of the corresponding alkali or ammonium hexacyanoferrate (II).

2. The process according to claim 1 comprising removing the water from the aqueous solution of the alkali or ammonium hexacyanoferrate (II) and recovering the alkali or ammonium hexacyanoferrate (II) in solid form.

3. The process according to claim 1 wherein a flocculating agent is added pH up to 8 prior to the water washing.

4. The process according to claim 3 wherein the flocculating agent is polyacrylamide.

5. The process according to claim 3 wherein the water soluble iron (II) salt is a nitrate or a halide wherein the halogen has an atomic weight of 35 to 127.

6. The process according to claim 1 wherein the aqueous calcium hexacyanoferrate (II) solution is an unfiltered solution which has been formed by the reaction of hydrogen cyanide, aqueous iron (II) salt solution and a calcium compound.

7. The process according to claim 1 wherein the iron (II) salt solution is a pickling solution.

8. The process according to claim 7 wherein the alkali cyanide solution is a waste solution from an electroplating operation.

9. The process according to claim 1 wherein the aqueous cyanide solution is a waste solution from an electroplating operation.

10. The process according to claim 1 wherein the iron (II) hexacyanoferrate is formed at 10° to 100°C. and the subsequent reaction with alkali or ammonium cyanide is carried out at 60°–95°C.

11. The process according to claim 1 wherein the iron (II) hexacyanoferrate (II) precipitate formed is washed by countercurrent flow with water, the precipitate in suspended condition goes downwardly and the water goes upwardly, the calcium salts are extracted from the precipitate by the wash water and the calcium ion free precipitate is recovered as a suspension, is concentrated and then reacted with the aqueous cyanide solution.

\* \* \* \* \*